United States Patent [19]

Parulski et al.

[11] Patent Number: 4,994,901
[45] Date of Patent: Feb. 19, 1991

[54] METHOD AND APPARATUS FOR INCREASING THE GAMUT OF AN ADDITIVE DISPLAY DRIVEN FROM A DIGITAL SOURCE

[75] Inventors: Kenneth A. Parulski; Donald C. Bellis, Jr., both of Rochester, N.Y.

[73] Assignee: Eastman Kodak Company, Rochester, N.Y.

[21] Appl. No.: 289,107

[22] Filed: Dec. 23, 1988

[51] Int. Cl.[5] .............................................. G03F 3/10
[52] U.S. Cl. ................................... 358/76; 358/21 R
[58] Field of Search ................... 358/76, 75, 80, 13, 358/21 R, 32; 340/701

[56] References Cited

U.S. PATENT DOCUMENTS

| | | | |
|---|---|---|---|
| 3,226,475 | 12/1965 | Percival | 358/32 |
| 4,183,046 | 1/1980 | Dalke et al. | 358/80 |
| 4,393,398 | 7/1983 | Horiguchi et al. | 358/76 |
| 4,598,282 | 7/1986 | Pugsley | 358/76 |
| 4,626,835 | 12/1986 | Nienaber et al. | |
| 4,630,100 | 12/1986 | Del Signore, II et al. | |
| 4,670,780 | 7/1987 | McManus et al. | |
| 4,682,186 | 7/1987 | Sasaki et al. | |
| 4,707,727 | 11/1987 | Penney | |
| 4,721,951 | 1/1988 | Holler | 358/80 |

FOREIGN PATENT DOCUMENTS 0048905  5/1989  European Pat. Off. ............ 340/701

OTHER PUBLICATIONS

Clapper, F. R. et al., "Color Gamuts of Additive & Subtractive Color-Reproduction System," Journal of Optical Soc. of America, vol. 63, No. 5, May 1973, pp. 625-629.

Primary Examiner—James J. Groody
Assistant Examiner—David E. Harvey
Attorney, Agent, or Firm—David M. Woods

[57] ABSTRACT

An additive display is driven from a digital source, such as a frame memory, to produce red and blue luminances that exceed the respective white point luminances of the display, thus producing saturated colors including red and blue and accordingly extending the gamut of the display system. The signals input to the frame memory are initially processed by a circuit, such as a color matrix, that is capable of corrections exceeding the white point of the image source. The processed signals are then encoded with more "headroom" for exceeding the respective white points of red and blue color values than for green color values. In one embodiment, the full red and blue bit resolution is bit-shifted and stored in the frame memory, with the red and blue white points stored as lesser code values than the green white point. The display drive signals produced from the encoded color values are then equalized for a common white point signal value before being applied to the additive display, such as a color CRT monitor.

22 Claims, 5 Drawing Sheets

METHOD AND APPARATUS FOR INCREASING THE GAMUT OF AN ADDITIVE DISPLAY DRIVEN FROM A DIGITAL SOURCE

BACKGROUND OF THE INVENTION

Field of the Invention

This invention pertains to the field of color video display and, in particular, to apparatus utilizing a color cathode ray tube (CRT) monitor or like additive system for displaying a still image obtained from a digital source.

BRIEF DESCRIPTION OF THE DRAWINGS

The prior art will be described in relation to the drawings, in which.

DESCRIPTION RELATIVE TO THE PRIOR ART

A typical additive display is a color CRT, which employs three electron beams for exciting three corresponding types of phosphors located on its screen. Each beam stimulates one type of phosphor to emit one of the three primary additive colors of light. The three primary colors are red, green and blue (RGB), which, when mixed in proper proportions, will form the other colors of the spectrum. For a CRT display, color is produced by the additive combination of light emitted by the various phosphors. The range of such colors that can be displayed, i.e., the color gamut, is an important attribute of a video system.

Figure 1:
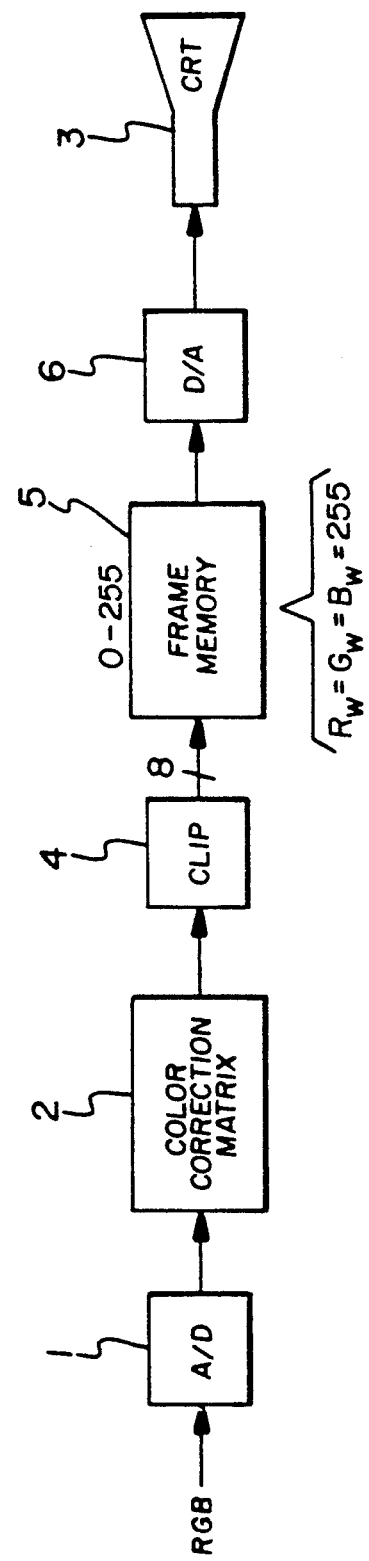
FIG. 1 is a block diagram of known apparatus for driving a CRT display from a digital source.

There are many digital imaging systems which store a still image as RGB digital values in a digital image memory, and display it on a color CRT monitor. FIG. 1 represents such a known system, in which RGB image signals are derived from an image source (e.g., from a camera). The RGB signals are digitized by an analog-to-digital (A/D) converter 1 and processed in a color correction matrix 2 (although the procedure could be reversed if the matrix is an analog circuit), which produces a set of image signals that are corrected for the particular phosphors used in a CRT display 3. While the input RGB signals are ordinarily balanced for white, and the white signal is the largest value the source can provide, the color matrixing process accounts for overlapping image sensitivities of the image source and the spectral energy overlap of the phosphors, and frequently calls for corrections that exceed the given white point of the source. The extreme values are typically removed in a clipper 4 so that the resulting digital code values may be conveniently stored in a commercially-available frame memory 5. For example, if an 8-bit frame memory is used, the corrected signals are clipped to eight bits and entered into the frame memory 5. Any excess bits are lost. The values are then converted into analog drive signals by a digital-to-analog (D/A) converter 6 and applied to the CRT display 3.

These systems are generally designed so that reference white is produced on the CRT display 3 by equal red, green and blue white point values $R_w$, $G_w$ and $B_w$. These are ordinarily the highest RGB digital code values that can be stored in the frame memory (e.g., code value 255 for an 8 bit frame memory). The maximum luminance of the red, blue and green primaries which can be produced by the system is therefore limited by the luminance used to produce reference white, and the gamut is accordingly limited. While the drive signals from the D/A converter to the video display producing the three electron beams are ordinarily equalized at some voltage level to produce a reference white, the luminance of the light emitted by the phosphors is not similarly equalized. The luminance values depend on the phosphor set used. For example, for a monitor using phosphors having a "C" set of chromaticities (as established by SMPTE standards) and operating at a white point of D65 for a total luminance output of 30 footlamberts (Ft.L), the luminance output of the green primary is 20 Ft.L, the luminance output of the red primary is 7 Ft.L, and the luminance output of the blue primary is 3 Ft.L. Therefore, while the maximum luminance of saturated greens is 20 Ft.L, the maximum luminance of reds and blues is much lower. As a result, except for green hues, such systems generally cannot reproduce higher luminance saturated colors including reds and blues.

Figure 2:
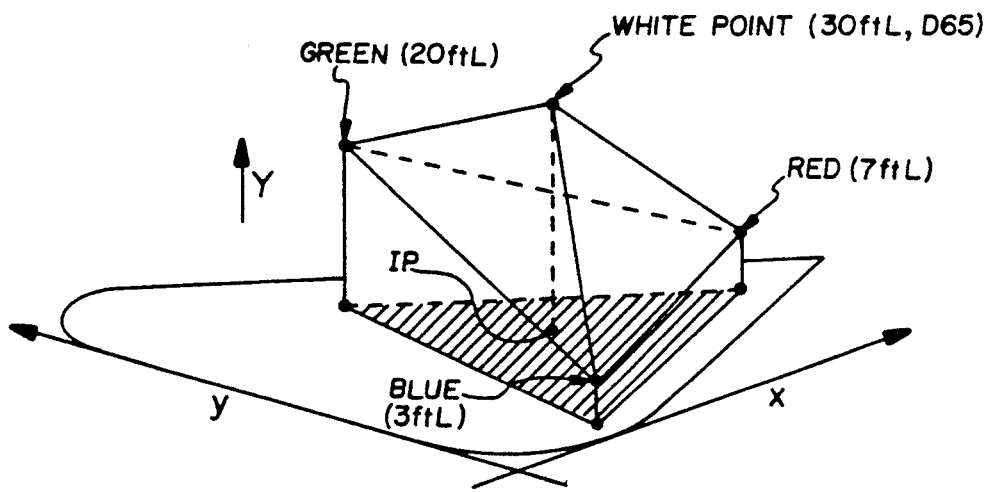
FIG. 2 is an illustration of the color gamut of a typical CRT display as provided by the apparatus of FIG. 1.

The effect is shown for a typical CRT display in FIG. 2, which graphs the volume of the gamut on a chromaticity diagram of the CIE system. Near the center of the shaded area is the illuminant point IP for D65 daylight. The hue, i.e., red, green, or blue, is indicated by the direction of a straight line drawn from the illuminant point IP toward the edge of the diagram. The longer the line, the greater the color saturation. The vertical line drawn perpendicular to any given point in the diagram represents the luminance of the color (in, as shown, footlamberts). Since the luminances are additive, the white point dictates the shape of the gamut solid. Only values within the gamut solid can be reproduced by the CRT display. The blue and red legs of the solid are quite short, compared to green, which makes it impossible to reach a number of higher luminance saturated colors, particularly in the red, blue and magenta directions. This is a problem when it is desirable to match the soft copy (CRT display) to hard copy from the same source, which often is capable of a fuller range of saturated colors. In addition, it is sometimes desirable to simply obtain deeper, more pleasing, colors from the CRT display.

SUMMARY OF THE INVENTION

Underlying the invention is the realization that the major limitation is not in the additive display, e.g., a CRT monitor, but rather in the digital source. Since the maximum code value was used to produce reference white, it is not possible for the digital system to "tell" the display to produce a saturated red with a luminance higher than, say, 7 Ft.L (or a saturated blue with a luminance higher than 3 Ft.L), because there is no way to produce code values greater than 255 (given 8 bit storage). The display itself is ordinarily capable of producing higher luminance saturated red (and blue) colors if it was "told" to do so by a signal of the appropriate amplitude. With the red and blue white point luminances so much lower than the green white point luminance, a large region of additional, usable "headroom" can be allowed above the red and blue white point values for producing additional saturated colors including red and blue. If sufficient "headroom" is allowed for all of the color information produced, e.g., by a color matrix input, it is possible to drive the display beyond the white point in whatever color the input dictates.

The invention involves driving an additive display with color signals from a digital source, the display having a characteristic white point comprised of predetermined signal values in each of several color components—typically, but not necessarily, red, green and blue. The color component signals are encoded according to a selection of code values specifying predetermined ranges of color values. In one aspect of the invention, the range of coded color values exceeding the white point, i.e., the "headroom", of at least one color component is greater than the range of coded color values exceeding the white point of at least one remaining color component. Typically, the red and blue signals are both encoded according to the invention with greater "headroom" than the green signal.

The display drive signal is then based on the values of the encoded color components. In particular, the drive signal includes several color drive signals, ordinarily red, green and blue drive voltages, that are processed to produce a peak white according to the characteristic white point of the display. Since the range of the coded color values representing the color components differs according to color, the production of the RGB drive voltages entails equalization of the drive voltages so that a peak white is produced. The processed color drive signals are applied to the display, thereby driving the display beyond the white point of at least the one color component and accordingly producing saturated colors including that component. The display, typically, is driven to its characteristic white point by equal RB voltages and driven beyond its white point in red and blue by greater RB voltages.

A preferred way of implementing the invention is to set the reference white point code value for red and blue less than the reference white point code value for green. For example, the green white point is set at the maximum code value and red and blue white points are set to one-half the maximum code value, i.e., for an 8 bit memory, green=255 and red=blue=127. It is generally possible to quantize the red and blue signals with at least one less bit of resolution than the green signal without introducing any additional perceivable quantization distortion in pictorial images. Therefore, this approach increases the useful gamut with no additional hardware and no additional perceived quantization artifacts.

The preferred implementation takes the full bit resolution of the red and blue information signals from the input and then bit-shifts the red and blue quantized signals by at least one bit so that the red and blue white point values are represented by lesser code values than the green white point value. This operation compresses the additional "headroom" into the same 8-bit memory, for example, as used by the green signal. The quantized signals are converted into analog red, green and blue voltage signals and then scaled so that the RGB analog values comprise substantially the same signal voltage for each color.

BRIEF DESCRIPTION OF THE REMAINING DRAWINGS

Figure 4:
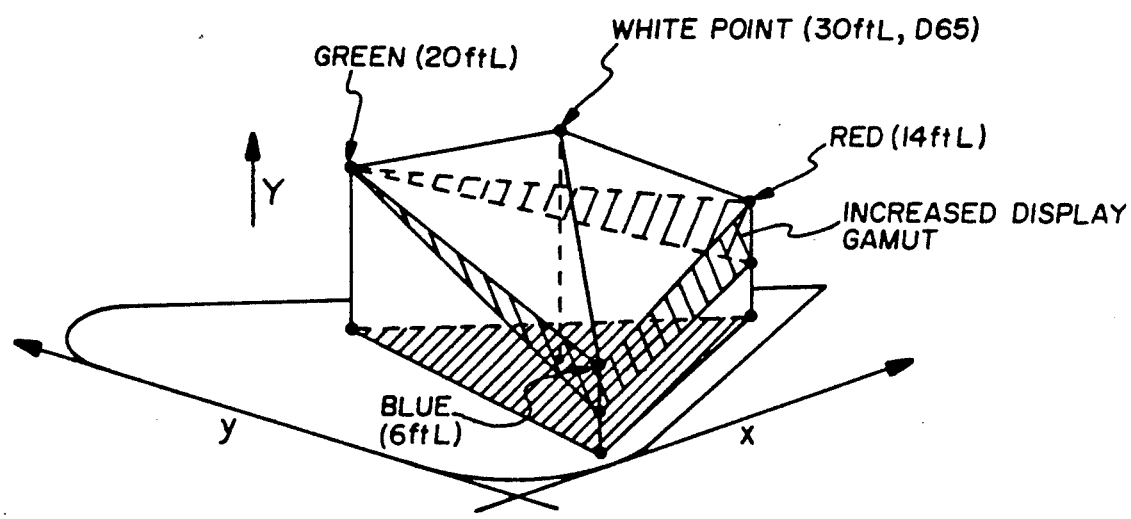
Figure 3:
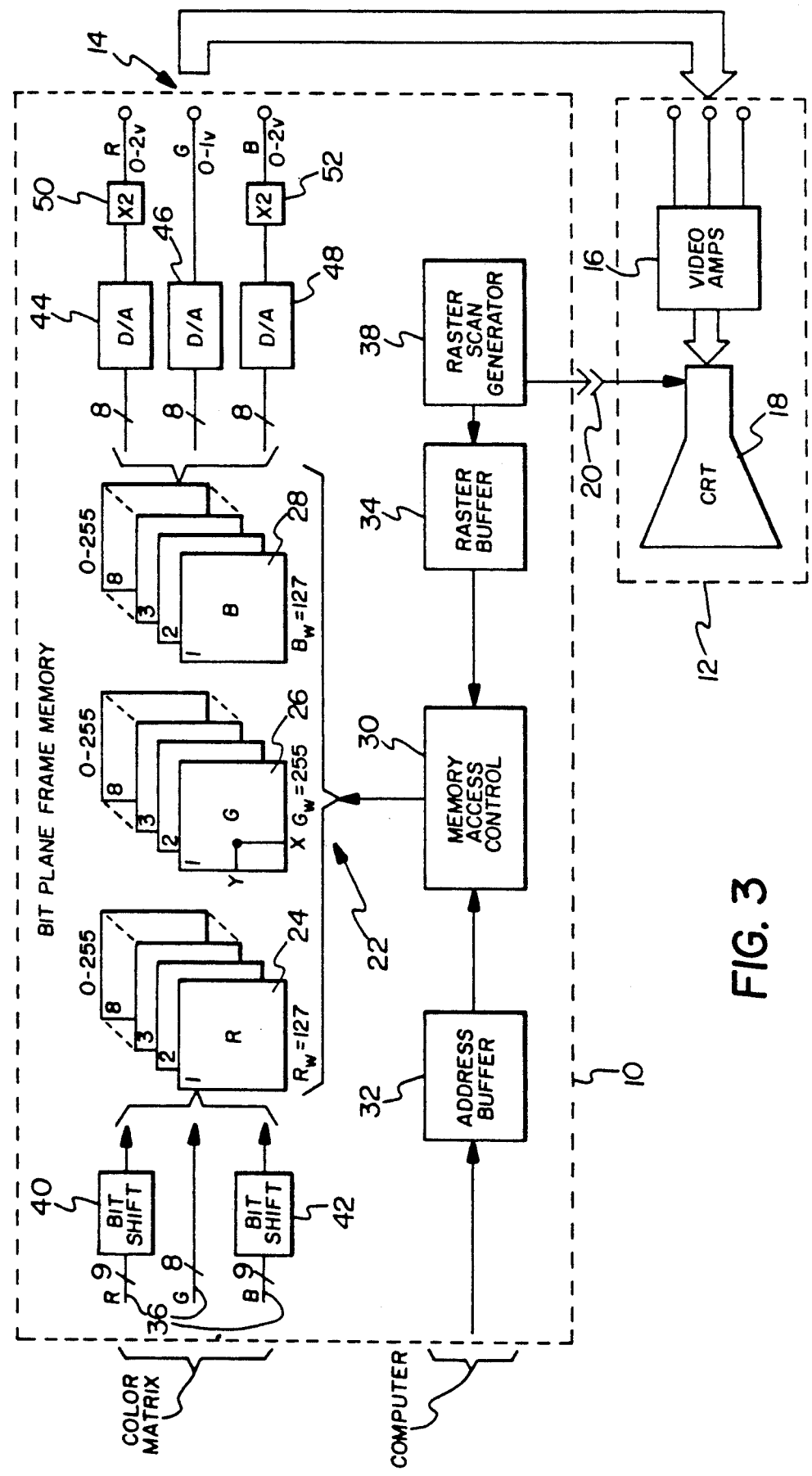
Figure 5:
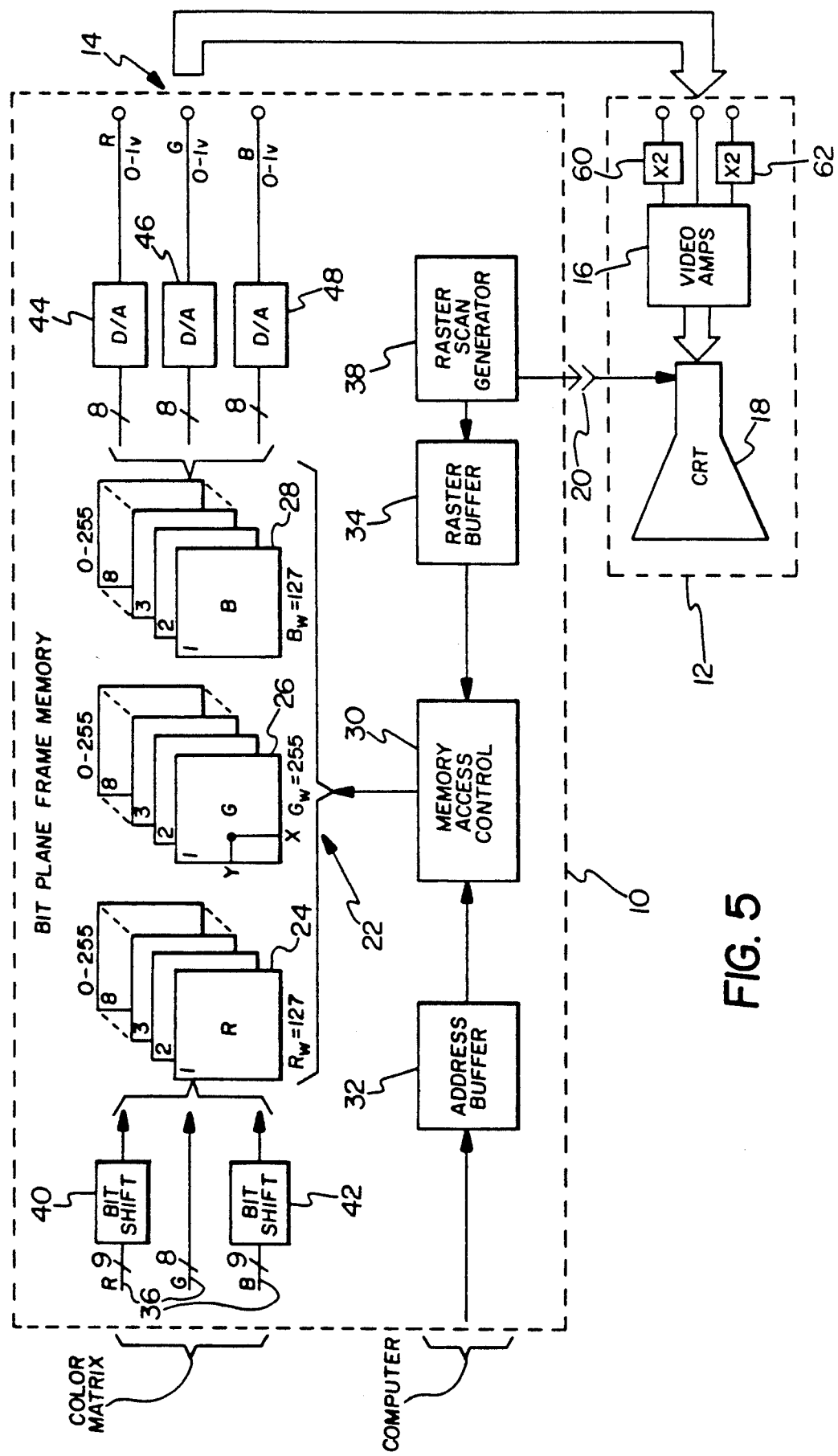
Figure 6:
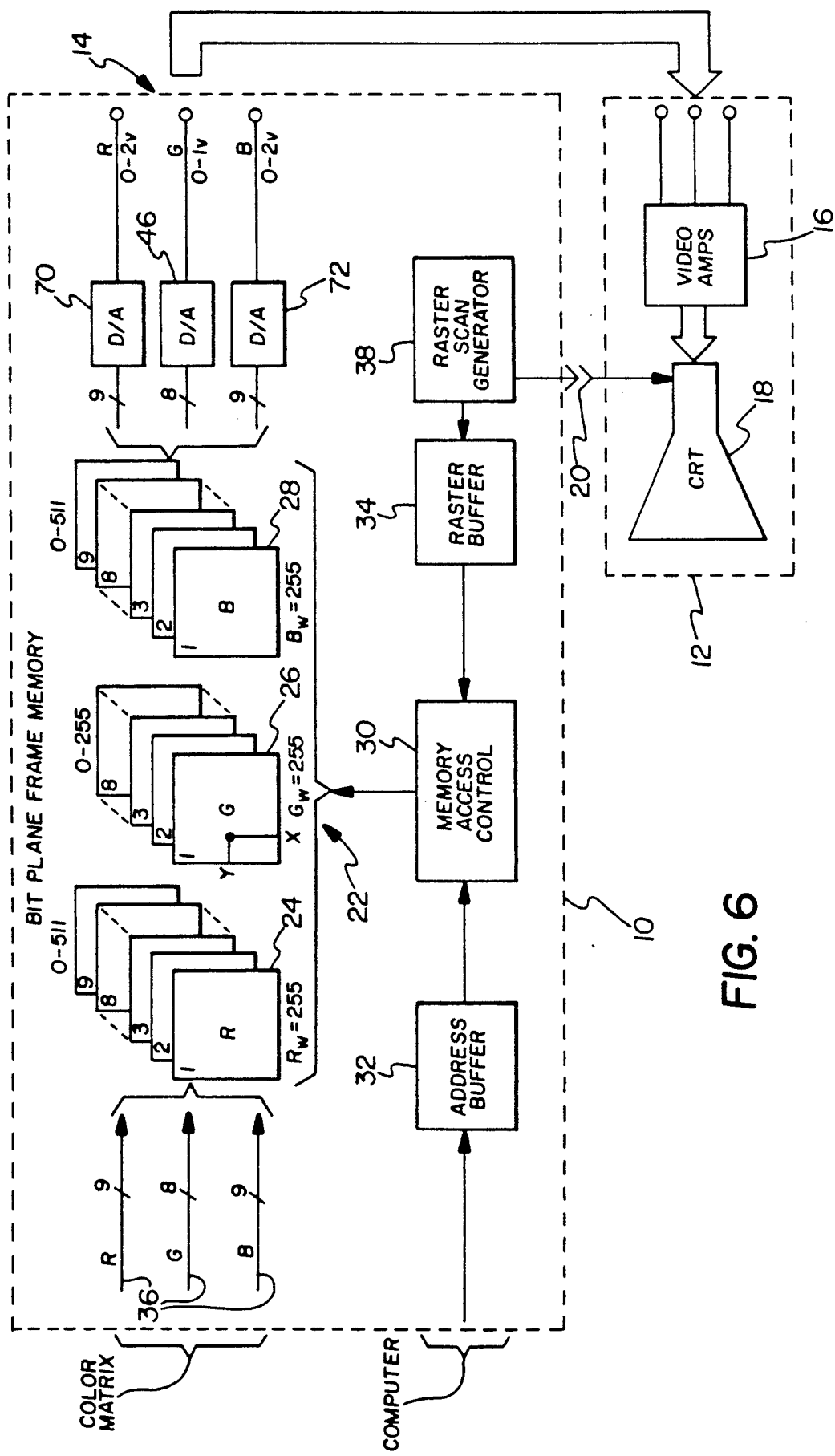

The invention will be described in relation to the remaining drawings, in which:

FIG. 3 is a block diagram of a first, preferred embodiment of the invention, showing a bit shift operation in the red and blue image planes;

FIG. 4 is an illustration of the extended color gamut of a typical CRT display as provided by the apparatus of FIG. 3;

FIG. 5 is a block diagram of a second embodiment of the invention, showing a drive gain adjustment in the red and blue channels of the monitor; and FIG. 6 is a block diagram of a third embodiment of the invention, showing use of full bit resolution in the red and blue bit planes.

DETAILED DESCRIPTION OF THE INVENTION

The invention is illustrated in relation to a display system utilizing raster scan output from an x-y addressed frame memory. Other elements of such a display system, either omitted or not shown in detail, may be readily selected from elements known in the art. The color input may come, as shown in FIG. 1, from a color matrix or, for example, from a computer graphics generator in which the color code words are directly generated by the system in accordance with user or other input instructions. While the invention is illustrated with a CRT display, other types of video monitors utilizing additive display, such as laser projection or liquid crystal display, may be used according to the invention, since additive displays in general possess similar white point relationships in the primary colors. What is therefore described of the CRT gamut, and its improvement according to the invention, applies to such other additive displays as well. Moreover, the invention may be utilized with other types of graphics displays, such as vector displays, or with any system in which image information from any source, be it software, scanner, camera, etc., is committed to digital storage.

Referring now to FIG. 3, the invention is illustrated in connection with the display generator section 10 of a digital imaging system. A monitor 12 is provided as a peripheral unit that attaches to a set of RGB terminals 14 on the display generator 10. The monitor 12 includes RGB video amplifiers 16, a CRT display tube 18 and an interconnection 20 for an external raster driving signal. For purpose of illustration, the CRT display 18 incorporates the aforementioned "C" phosphors, which for a white point of D65 produce a total luminance of 30 Ft.L. As discussed earlier, such a CRT display ordinarily produces, absent the invention, the gamut shown in FIG. 2. If a different white reference point were used, for example D50 as is common in the graphic arts, or if different CRT phosphors were used, the shape of the normal, unimproved gamut as shown in FIG. 2 would change only slightly.

The raster scan output is derived from digital color signals stored by the digital imaging system in a bit plane frame memory 22 in the form of digital code words representing color values. The CRT intensity is controlled by reading out and decoding a sequence of the code words stored in the memory 22, one word per x,y location. The number of bits per word in the memory 22 depends on the number of intensity levels desired in the display. The preferred embodiment of FIG. 3 shows separate sets of bit plane memories 24, 26 and 28, each storing eight bits in the respective color primaries red, green and blue. This allows the storage of 8-bit code words for each x,y pixel location in each color. Thus each pixel can be specified within a range of 0–255 code values, corresponding to 0–255 distinct color values. The memory 22 is of multi-port design, in which the scan-synchronous addressing for display readout has priority over x,y addressing for input of color information. Access time is sufficient, however, for the imaging system to write new display information into the memory 22. In that connection, a memory access controller 30 receives x,y input addresses from an address buffer 32 and raster scan addresses from a raster buffer 34. A computer (not shown) in the digital imaging system generates the x,y input addresses in conjunction with color information applied to an input bus 36. A raster scan generator 38 generates raster scan addresses in conjunction with deflection signals applied to the raster driving port 20 on the monitor 12. The color input information originates, for example, as RGB signals from a color correction matrix, such as the known matrix 2 shown in FIG. 1, or as RGB signals from a known graphics display computer (not shown).

In accordance with this embodiment of the invention, the code values corresponding to red and blue white point values $R_w$ and $B_w$ are reduced by half before being stored in the frame memory 22. One way of doing this, as shown by FIG. 3, is to omit clipping in at least the red and green input channels, instead applying the full bit range of red and blue values from the color correction matrix to the input bus 36. Such an enlarged range is ordinarily accommodated by coding to an extra bit (9 bits total) of resolution. Then the bit fields of the red and blue code words are shifted by one bit in a pair of bit shifters 40 and 42 before being stored in the memory 22. By defining the 9 bit code word input in red and blue so that an 8 bit maximum continues to define the white points $R_w$ and $B_w$, the shifted code words represent the white point at half their former value, i.e., $R_w = B_w = 127$ ($= \frac{1}{2} G_w$). The code words are raster-addressed by the memory access controller 30 and decoded in a set of 8-bit digital-to-analog (D/A) converters 44, 46 and 48. At this stage, the white point outputs of the red D/A 44 and the blue D/A 48 are half the white point output of the green D/A 46. Because reference white for a typical CRT requires equal red, green and blue drive voltages, a pair of gain adjustments 50 and 52 are applied to the red and blue analog voltages output from the D/A converters 44 and 48. In a typical example, therefore, the red and blue analog voltages vary over twice the range of the green voltage, e.g., between 0-2 volts for red and blue compared to 0-1 volt for green.

The additional red and blue range corresponds to reds and blues greater than the red and blue white points $R_w$ and $B_w$ for the CRT display 18. The red and blue phosphors are thus stimulated to produce additional red and blue light, namely, red light up to 14 Ft.L and blue light up to 6 Ft.L. The effect is further seen in the larger gamut volume shown in FIG. 4. With the red and blue code words set to half the green code words for equivalent white points, substantial "headroom" is allowed for greater luminances in the blue and red areas of the diagram. This allows greater saturation for reds, blues and magentas. A different white reference or different phosphors would change the gamut only slightly, and the benefits illustrated by FIG. 4 would be largely preserved.

Several likely variations are now addressed. The additional bit range does not need to correspond to one additional bit of resolution, nor does the full range afforded by an additional bit or bits have to be utilized. Moreover, the red, green and blue white points do not have to be equal before bit shifting. This implies that the additional ranges in red and blue may be unequal and the gain adjustments provided after D/A conversion may likewise be unequal. Furthermore, some known systems employ an equal amount of "headroom" between all three of the RGB code values corresponding to the difference between the display white point and the maximum code value. This offers some advantage in reproducing uncolored, specular highlights. The input is nonetheless clipped as in the known system of FIG. 1 and valuable color values are lost. The present invention departs from such teaching to supply unequal "headroom" especially in red and/or blue to improve the rendition of saturated colors and, indeed, to reproduce some saturated colors outside the known reproduction gamuts. Since the luminance of the green primary for reference white is much larger than for red or blue, there is ordinarily less need to increase the gamut for green hues. There are times, however, when even green can be increased to produce, for instance, a deeply saturated yellow. In such situations, it is within reach of the invention to increase the green "headroom", even at the expense of the red and/or blue. It is thus seen that the teaching represented by FIG. 4 is to raise the "roof" of the gamut volume in any or all directions, thus reproducing "new" colors including higher luminance values of red, green, or blue.

A second embodiment of the invention, shown in FIG. 5, differs from the embodiment of FIG. 3 only in the location of the gain adjustment. The output voltages from the D/A converters 44, 46 and 48, which typically vary over a range of, e.g., 0-1 volts each, are applied directly to the RGB output terminals 14 of the digital display section 10. The gain adjustments in the red and green channels are made by gain circuits 60 and 62 in the monitor 12. With these adjustments, the red and blue signal voltages vary, e.g., between 0-2 volts, and 1 volt continues to represent the red, green and blue white points. FIG. 6 illustrates a third embodiment in which the code values for red, green and blue white points remain equal, but additional headroom is specifically allowed in the frame memory 22 for additional color values for red and green above their respective white points. For example, an additional bit plane is allowed in the red and blue sections 24 and 28 of the bit plane frame memory 22. This allows a range of 0-511 in red and blue compared to a useful range of 0-255 in green. Since the full nine-bit resolution of red and green is being processed, the stored red and blue information is converted into analog drive signals by a pair of nine-bit D/A converters 70 and 72. The analog voltages for red and blue, for example, directly range between 0-2 volts while the green voltage between ranges 0-1 volt, and 1 volt continues to represent the respective red, green and blue white points.

The invention has been described in detail with particular reference to a presently preferred embodiment, but it will be understood that variations and modifications can be effected within the spirit and scope of the invention.

What is claimed is:

1. Apparatus for driving an additive display with color signals from a digital source, the display having a characteristic white point comprised of predetermined signal values in each of several color components, said apparatus comprising:

means for digitally encoding the color component signals according to code values specifying predetermined ranges of color values, whereby the range of color values exceeding the white point of at least one color component is greater than the range of color values exceeding the white point of at least one remaining color component;

means for generating a display drive signal based on the values of the encoded color components, said drive signal including color drive component signals that are processed to produce a peak white according to the characteristic white point of the display; and means for applying the color drive component signals to the display, thereby driving the display beyond the white point of said one color component and accordingly producing saturated colors including that component.

2. Apparatus as claimed in claim 1 in which the additive display is a CRT display.

3. Apparatus for driving an additive display with color signals from a digital source, the display having a characteristic white point comprised of predetermined color signal values, said apparatus comprising:

means for generating a set of digital color signals corresponding to red, green and blue components;

digital means for separately storing the red, green and blue components according to code values specifying predetermined ranges of color values, whereby the range of color values exceeding the white point luminance of at least a first color component is greater than the range of color values exceeding the white point luminance of at least one other color component;

means for generating a display drive signal based on the values of the stored color signals, said drive signal including analog red, green and blue drive component signals that are processed in view of the aforesaid unequal ranges to produce a peak white according to the characteristic white point of the display; and means for applying the drive signal to the display, thereby driving the display beyond the white point of said first color component and accordingly producing saturated display colors including that component.

4. Apparatus as claimed in claim 3 in which said coded color values comprise bit strings of defined lengths and said color signal generating means generates said first color component with a range exceeding its white point by one or more additional bits of resolution.

5. Apparatus as claimed in claim 4 in which said color signal generating means further comprises means for shifting said one or more additional bits of said first component so that the coded values of all color components are equalized to the same bit length, and the processing provided by said drive signal generating means provides additional amplification of said first color component to substantially equalize the analog white point levels of the red, green and blue drive component signals.

6. Apparatus as claimed in claim 4 in which said storing means provides sufficient capacity for storing said first color component including said additional bits of resolution and said drive signal generating means includes a digital-to-analog converter with sufficient bit resolution to process said first color component including said additional bits.

7. Apparatus as claimed in claim 3 wherein said color signal generating means quantizes said first color component with at least one less bit of amplitude resolution whereby the code value specifying the white point of said first color component is less than the code value specifying the white point of said other component.

8. Apparatus as claimed in claim 3 in which the additive display is a CRT display.

9. Apparatus for driving an additive display with color signals from a digital source, the display having a characteristic white point comprised of predetermined red, green and blue signal values, said apparatus comprising:

means for generating digital code values for color signals obtained from a source that provides an unequal range of code assignments for color values exceeding the respective red, green and blue white points;

means for generating a display drive signal based on the coded red, green and blue colors, said drive signal including red, green, and blue voltage signals that are adjusted in view of the unequal ranges to produce a peak white according to the characteristic white point of the display; and means for applying the drive signal to the display, thereby driving the display beyond the white point for certain of the colors and accordingly producing saturated colors including those certain colors.

10. Apparatus as claimed in claim 9 in which the source is a color matrixing circuit.

11. Apparatus as claimed in claim 9 in which the source is a graphics display generator.

12. Apparatus for driving a CRT display with color signals from a digital source, said CRT display having a characteristic white point comprised of predetermined red, green and blue signal values, said apparatus comprising:

means for generating red, green and blue input signals;

means for digitally encoding the input signals with a greater range of quantization levels provided for red and blue than for green for color values exceeding the respective red, green and blue white points;

means for generating a CRT drive signal based on the coded red, green and blue signals, said drive signal including red, green and blue voltage signals that are equalized to produce a peak white according to the characteristic white point of the CRT display; and means for applying the CRT drive signal to the CRT display, thereby driving the CRT display beyond the red and blue white point values and accordingly producing saturated colors including red and blue.

13. Apparatus as claimed in claim 12 in which said means for digitally encoding the input signals represents the red, green and blue white points with substantially the same bit assignment and the red and blue color values exceeding the respective red and blue white points with additional bits.

14. Apparatus as claimed in claim 13 in which said means for generating a CRT drive signal includes a plurality of digital-to-analog converters for generating said voltage signals from the digitally coded signals, the digital-to-analog converters for the red and blue coded signals having additional bit resolution to render the color values exceeding the respective red and blue white points.

15. Apparatus as claimed in claim 12 in which said means for digitally encoding the input signals further comprises:

means for initially representing the red, green and blue input signals with bit assignments that render the white point of the CRT display by the same code value for each color; and means for shifting the bit field for the red and blue bit assignments by at least one bit so that, after shifting, the red and blue white points are represented by lesser bit assignments than the green white point.

16. Apparatus as claimed in claim 15 in which said means for generating a CRT drive signal comprises:

means for converting the coded red, green and blue signals into said voltage signals; and means for scaling the red and blue voltage signals relative to the green voltage signal so that the analog white points comprise substantially the same signal voltage for each color.

17. Apparatus for driving a CRT display with color signals from a digital source, said CRT display having characteristic white point comprised of predetermined color values, said apparatus comprising:

means for generating red, green and blue signals;

means for quantizing the red and blue signals at a relatively lower bit resolution than the green information signal so that peak white is achieved at a relatively lower code value for red and blue than for green;

digital-to-analog converters for generating analog red, green and blue signals from the quantized signals;

means for unequally amplifying the red, green and blue analog signals so that peak white is achieved at substantially the same signal voltages for each color; and means for driving the CRT display with the amplified analog signals.

18. A method for driving an additive display with color signals from a digital source, said display having a characteristic white point comprised of predetermined signal values in each of several color components, said method comprising the steps of:

generating a set of color component signals;

digitally encoding the color component signals according to code values specifying unequal ranges of color values exceeding the respective white points of the color components;

generating a drive signal based on the encoded color component signals, said drive signal including analog color drive component signals equalized to produce a peak white according to the characteristic white point of the display; and applying the equalized color drive component signals to the display.

19. A method for driving a CRT display with color signals from a digital source, said display having a characteristic white point comprised of predetermined red, green and blue white point values, said method comprising the steps of:

generating red, green and blue digital signals with unequal headroom for additional code values above the respective red, green and blue white point values;

generating a CRT drive signal from the red, green and blue digital signals, said digital signals processed in view of the unequal headroom to provide equalized analog red, green and blue drive signals; and applying the red, green and blue drive signals to the CRT display, thereby driving the CRT display beyond the white point value of at least one of the colors and accordingly producing a saturated display including that color.

20. A method as claimed in claim 19 in which the step of generating digital signals with unequal headroom represents the additional headroom with additional bits of resolution and the step of generating a CRT drive signal includes converting the digital signals into analog signals with additional resolution to process the additional headroom.

21. A method as claimed in claim 19 in which the step of generating red, green and blue digital signals provides the additional headroom by lowering the bit resolution by one or more bits, and the step of generating a CRT drive signal comprises (a) converting the digital signals into analog voltage signals and (b) scaling the voltage signals so that the red, green and blue drive voltages are equal.

22. A method for driving a CRT display with color signals from a digital source, said method comprising the steps of:

generating red, green and blue digital signals;

bit-shifting the red and blue signals;

storing the red, green and blue digital signals as equal length code words;

converting the stored signals into analog voltage signals;

amplifying the red and blue voltage signals relatively more than the green signal; and applying the amplified voltage signals to the CRT display.

* * * * *